Oct. 10, 1939.  H. J. GORDON  2,175,661
HOSE AND STOCKING DRIER
Filed May 18, 1938
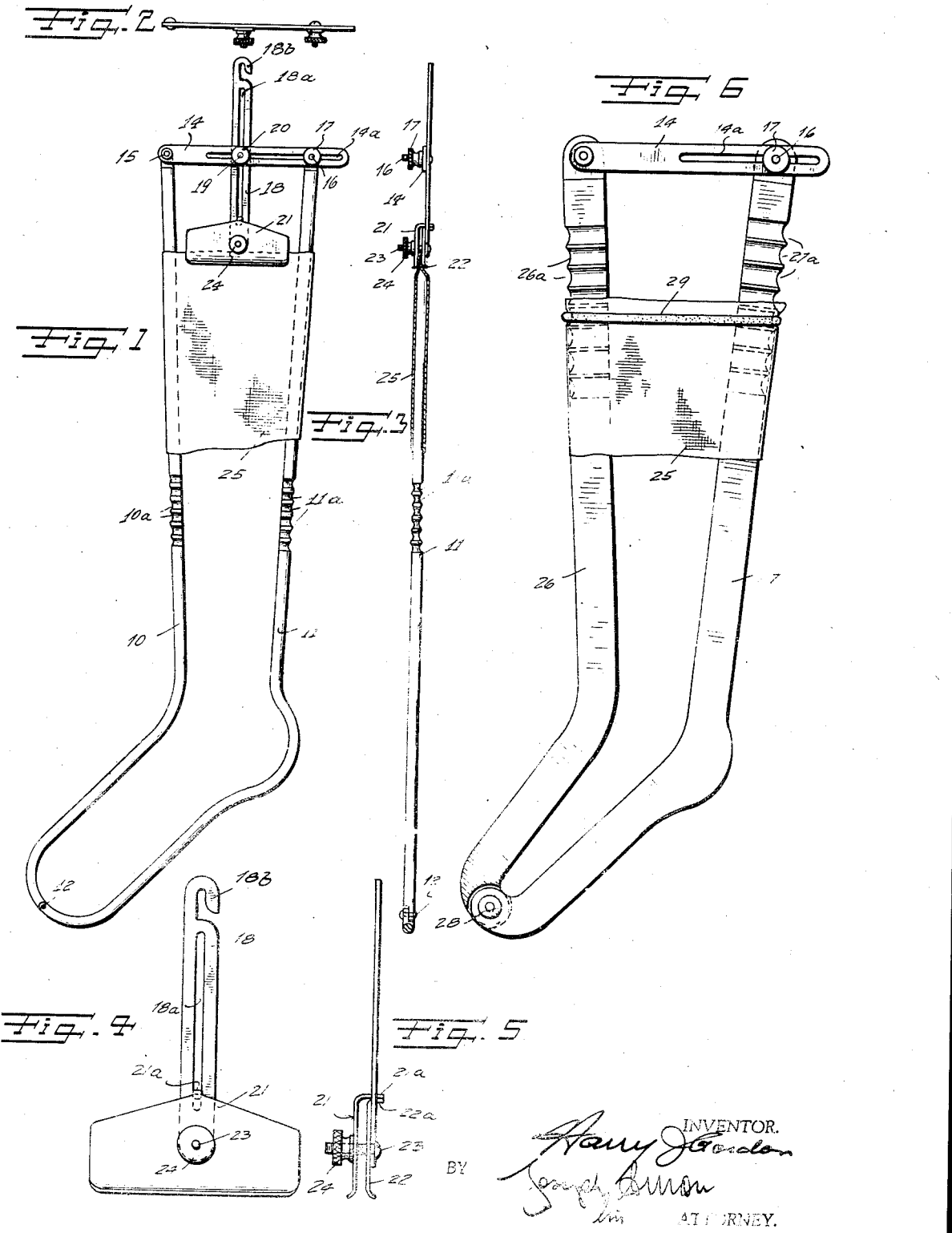

Patented Oct. 10, 1939

2,175,661

UNITED STATES PATENT OFFICE 2,175,661

HOSE AND STOCKING DRIER

Harry J. Gordon, New York, N. Y.

Application May 18, 1938, Serial No. 208,591

2 Claims. (Cl. 223—77)

My invention relates to improvements in hose and stocking driers and appertains particularly to collapsible and adjustable hose and stocking driers embodying means to guard against shrinkage of hose or stockings while in the process of drying.

It is one of the aims of this invention to provide certain collapsible and adjustable means to easily attach, stretch and securely hold a hose or stocking upon the drying medium.

These and other aims I attain by the novel combination of various parts and elements, fully described in this specification and illustrated in the accompanying drawing, in which:

Figure 1 represents a front view of the preferred form of embodiment of my invention.

Figure 2 represents a top view of Figure 1.

Figure 3 represents a sectional side view of Figure 1.

Figures 4 and 5 are enlarged views, of the gripping member shown in Figure 1.

Figure 6, represents a front elevation of a modified structure of the drier shown in Figure 1.

The commonly known methods of drying hose or stockings provide, practically, no means for stretching or safeguards against shrinkage and with this in view my invention intends to provide novel and practical means for just such purposes.

In Figures 1 to 3, two members 10 and 11, preferably made of nonoxidizing wires or rods, shaped to conform to the outlines of hose or stockings, are movably joined by means of a suitable pivot member 12. With this arrangement members 10 and 11 can be either collapsed towards each other or moved apart as required, thus first facilitating the insertion of the frame into the hose or stocking, second to laterally stretch hose or stocking to any desired width. To secure the lateral stretching, a slotted link member 14, pivoted at 15 upon the top-end of member 10, the slot 14a engaging a fixed stud 16 mounted upon the top-end of member 11 and held thereon by means of a nut 17, is provided to permit any desired adjustment for width. Now to guard against shrinkage in the longitudinal direction, another slotted link member 18 is provided and adjustably secured by slot 18a to member 14 by means of screw or bolt 19 and nut 20. The lower end of slotted link 18 carries a pair of gripping jaws or blades 21 and 22 arranged to permit either clamping or releasing hose or stocking by means of screw 23 and nut 24, thus longitudinal adjustability is attained. Figures 4 and 5 show enlarged views of this longitudinal adjustment feature. Suitably formed prongs 21a and 22a prevent jaws 21 and 22 from being horizontally displaced. The upper end of slotted member 18 is provided with a suitable hook 18b to permit hose or stocking being hung upon a clothes-line or rod for the process of drying.

Figure 6 illustrates a modified structure of Figure 1 inasmuch as frame members 10 and 11 are replaced by substantially flat frame members 26 and 27, made of wood, metal or plastic material. Members 26 and 27 are similarly pivotally joined at 28 and carry at their top-ends a similar slotted link member 14 mounted and arranged in the same manner as described in Figure 1. The longitudinal stretching and adjusting members 18, 21 and 22 are displaced by a flexible band member 29, made of rubber or kindred material, engaging hose or stocking 25 and holding same in position by means of suitable notches 26a and 27a provided upon members 26 and 27. This feature may of course be applied to the frame structure shown in Figure 1 by providing grooves or notches 10a and 11a in frame members 10 and 11 as shown in Figures 1 and 3.

What I claim as new and desire to secure by Letters Patent is:

1. In a collapsible and adjustable hose drier the combination of a pair of movably joined hose engaging members, said pair of hose engaging members formed and shaped to conform to the outline of a hose, a laterally disposed slotted hose stretching and spreading member movably joined to the top end of one of said hose engaging members and adjustably connected with the other hose engaging member, and a longitudinally disposed hose holding and stretching member comprising a pair of hose clamping jaws movably joined to a slotted adjusting member, and said slotted adjusting member disposed to engage and adjustably connect with said lateral hose spreading member, substantially as and for the purpose set forth.

2. In combination with a collapsible and adjustable stocking drier of the character described, a pair of flexibly joined stocking engaging members shaped and formed to conform to the contour of a stocking, a laterally disposed slotted stocking spreading member pivotally joined to the top end of one of said stocking engaging members and adjustably connected with the other stocking engaging member, and a longitudinally disposed stocking gripping and stretching member comprising a pair of stocking gripping jaws loosely joined to a longitudinally disposed slotted adjusting member, and said slotted adjusting member disposed to engage and adjustably connect with said lateral slotted stocking spreading member, substantially as and for the purpose set forth.

HARRY J. GORDON.